US012103820B2

(12) United States Patent
Lo Jacono et al.

(10) Patent No.: US 12,103,820 B2
(45) Date of Patent: Oct. 1, 2024

(54) CAR FLOOR FOR AN ELEVATOR CAR AND METHOD FOR INSTALLING AN ELEVATOR CAR

(71) Applicant: Inventio AG, Hergiswil (CH)

(72) Inventors: Romeo Lo Jacono, Gravesano (CH); Elena Carrara, Lucerne (CH); Kurt Steiner, Ebikon (CH); Stephen Hart, Lucerne (CH); Luis Gimeno, Saragossa (ES); Johannes Haderer, Adligenswil (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/253,942

(22) PCT Filed: Nov. 23, 2021

(86) PCT No.: PCT/EP2021/082600
§ 371 (c)(1),
(2) Date: May 23, 2023

(87) PCT Pub. No.: WO2022/112211
PCT Pub. Date: Jun. 2, 2022

(65) Prior Publication Data

US 2024/0010466 A1 Jan. 11, 2024

(30) Foreign Application Priority Data

Nov. 30, 2020 (EP) .................................... 20210527

(51) Int. Cl.
*B66B 11/02* (2006.01)
*B66B 19/04* (2006.01)

(52) U.S. Cl.
CPC .......... *B66B 11/0226* (2013.01); *B66B 19/04* (2013.01)

(58) Field of Classification Search
CPC ............................ B66B 19/04; B66B 11/0226
See application file for complete search history.

(56) References Cited

U.S. PATENT DOCUMENTS 7,137,485 B2 * 11/2006 Barneman ............. B66B 19/002 187/407
2019/0071283 A1 3/2019 Thomas et al.

FOREIGN PATENT DOCUMENTS

CN 106006319 A * 10/2016
CN 211198292 U 8/2020
CN 114436079 A * 5/2022
DE 102007025545 A1 * 12/2008 ......... B66B 11/0226
DE 112014007283 T5 10/2017
EP 1004538 A1 5/2000
(Continued)

OTHER PUBLICATIONS

Machine Translation of DE 10 2007 025 545.*
Machine Translation of JPH 11246148.*

*Primary Examiner* — Diem M Tran
(74) *Attorney, Agent, or Firm* — William J. Clemens; Shumaker, Loop & Kendrick, LLP

(57) ABSTRACT

A car floor for an elevator car includes a planar base part and installation feet arranged thereon. The installation feet support the car floor on the shaft floor of an elevator shaft during the elevator car installation phase. In order to orient the base part in a horizontal position, each of the installation feet is in the form of a height-adjustable installation foot. The height-adjustable installation foot has a threaded rod as part of a threaded spindle for height adjustment.

10 Claims, 3 Drawing Sheets

(56) References Cited

FOREIGN PATENT DOCUMENTS

| | | | |
|---|---|---|---|
| JP | H11246148 | A | 9/1999 |
| WO | 2006026872 | A2 | 3/2006 |
| WO | 2015045097 | A1 | 4/2015 |

* cited by examiner

CAR FLOOR FOR AN ELEVATOR CAR AND METHOD FOR INSTALLING AN ELEVATOR CAR

FIELD

The invention relates to a car floor for an elevator car and to a method for installing an elevator car.

BACKGROUND

Elevator systems for conveying people and goods contain elevator cars that can be moved up and down in an elevator shaft. The cars can be moved by means of a drive unit via suspension means, for example in the form of suspension cables or suspension belts. No car frames are required for self-supporting elevator cars. In order to install elevator cars of this kind, the car floor is brought into the shaft pit. Subsequently, the car side walls and the ceiling can be installed so as to complete the elevator car. The shaft floor is often not quite flat. There is therefore a need to compensate for such unevennesses or to carry out leveling of the car floor for other reasons.

SUMMARY

It is therefore an object of the present invention to avoid the disadvantages of the known car floor and, in particular, to provide a car floor by means of which the leveling of the car floor can be performed in a simple and efficient manner.

This and other objects are achieved according to the invention by means of a car floor having the features described below. The car floor for an elevator car comprises a preferably planar base part for defining a standing area for passengers in the interior of the elevator car. Due to the fact that installation feet are arranged on the base part, at least one of the installation feet and preferably each of the installation feet being a height-adjustable installation foot in order to orient the base part in a horizontal position, leveling of the car floor are carried out simple and efficient manner. Installation foot receptacles for receiving the installation feet can also be provided on the base part, such that installation feet can be arranged on the base part. The car floor can be supported or placed on a shaft floor of an elevator shaft of the elevator system via the installation feet during an installation phase. Therefore, by means of the height-adjustable installation foot, the local vertical position of the base part in the region of the relevant installation foot can be adjusted. In other words, the height adjustment relates to the distance between the base part and the car floor. This distance can be increased or decreased and thus the desired height can be set depending on the direction in which the adjustment is made at the relevant height-adjustable installation foot.

The installation feet can optionally be removed again after the end of the installation phase. However, the installation feet can also be arranged permanently on the base part.

The base part is, for example, a component in a composite structure or sandwich construction, as is known for example from EP 1 004 538 A1. The base part comprises a base plate, a cover plate, and an intermediate composite structure core. The composite structure core, which forms the connection between the base plate and the cover plate, can be constructed from a plurality of upright, intersecting lamellae in the form of a grating, which are rigidly connected to the base plate and the cover plate in a suitable manner. Of course, the base part can also be constructed in another way. For example, the core could be formed by one or more layers of honeycomb-like structures. Instead of the above-mentioned preferably planar base part having a base plate for forming an underside and a cover plate for forming an upper side, other car floor shapes, such as the shape that is trapezoidal when viewed from the side and disclosed in WO 2006/026872 A2, in combination with the height-adjustable installation feet described here are also conceivable.

In order to create a substantially cuboid elevator car, the base part can have a rectangular shape in plan view. In this case, in particular, it is advantageous if four installation feet are provided which are arranged in the corner regions of the base part. Further installation foot receptacles can be provided in the corner regions of the base part. The arrangement in the corner region includes an arrangement of the installation feet in the vicinity of or adjacent to the corners of the base part. It is therefore not necessary for the installation feet to be positioned directly at the geometric corner. The installation feet can be positioned within or outside the vertical projection of the base part.

The car floor can thus be supported on the shaft floor via preferably four height-adjustable installation feet during the installation phase. As an alternative to the arrangement in the corners, it would also be conceivable to arrange the installation feet centrally on the four sides of the rectangular base part.

The relevant height-adjustable installation foot can be designed in such a way and can preferably be actuated manually in such a way that the height adjustment can take place from the base part. Instead of manual actuation, it is alternatively also conceivable to carry out the height adjustment using drives. Motor-driven installation feet of this kind could also be operated by remote control.

For the height adjustment, the relevant height-adjustable installation foot can be moved upward and downward in the vertical direction by mechanical means, for example by means of a screw mechanism. As an alternative to the screw mechanism, other mechanical means, such as a ratchet mechanism, a carriage guide, a crank device, a latching device, a telescopic rod, or a carriage guide, are also possible. Instead of mechanical means, hydraulic or pneumatic means for adjusting the height of the installation foot are also conceivable.

The installation foot can be height-adjustable via a threaded spindle. Threaded spindles of this kind are cost-effective and are characterized by robust and simple handling. The height-adjustable installation foot operable by means of the threaded spindle can thus be easily adjusted to the desired height.

The relevant height-adjustable installation foot can have a threaded rod which is received or can be received in an internal thread associated with the base part and corresponding to the threaded rod in order to form the threaded spindle. The installation foot can thus be designed as a spindle screw. During the installation phase and if the threaded rod is arranged on the base part, the threaded rod extends preferably in the vertical direction. The internal thread can form the previously mentioned installation foot receptacle.

Spacer elements for positioning the installation feet outside of a vertical projection of the base part can be fastened or integrally formed laterally on the base part. The spacer elements can contain the internal threads in which threaded rods of the installation feet can be received or receivable. The spacer elements are, for example, angular pieces which are fastened to vertical side wall portions of the base part.

For reasons of space, it may be advantageous if the installation feet are positioned within a vertical projection of the base part. In order to position the installation feet within the vertical projection of the base part, the base part can have internal threads which are integrated therein and into which respective associated threaded rods are received or can be received in order to form the height-adjustable installation feet. For this purpose, the base part can have holes on the inside in the corner regions, into which holes the threaded rods are passed, wherein it is possible for the holes to have internal threads at least in portions in order to form the threaded spindle. For this purpose, the above-mentioned base plate of the base part can have one hole for each installation foot, into which hole the threaded rods are passed or inserted.

For secure positioning, it may be advantageous if stamp-like support elements for increasing the contact surface area with respect to the shaft floor are arranged on the lower ends of the respective threaded rods facing the shaft floor. The support elements can, for example, be connected to the threaded rods in an articulated manner via ball bearings.

Engagement or actuating means such as tool holders for screwdrivers or wrenches, adjusting screws having separate rotary handles, thumb screws, or tommy screws can be arranged on the upper end of the threaded rods, as a result of which the manual actuation of the threaded spindle for the height adjustment of the installation foot is simplified.

It may then be advantageous if a lock nut is attached to each threaded rod in order to secure the height adjustment.

It may further be advantageous if at least one spirit level is fastened to the base part for checking the horizontal position. The spirit level can be fastened at least temporarily or permanently to the base part. The spirit level may be a circular spirit level or a tubular spirit level. The spirit level can be fastened to the base part by means of an adhesive connection. If tubular spirit levels are used, it may be advantageous if the tubular spirit levels are arranged crosswise with respect to one another.

A further aspect of the invention relates to a method for installing an elevator car in an elevator shaft of an elevator system. The method can comprise the following steps: (i) introducing a car floor, in particular the car floor described above, into the elevator shaft, the car floor being set down on the shaft floor; (ii) leveling the car floor resting on the shaft floor via installation feet, by actuating at least one height-adjustable installation foot arranged on the car floor in order to adjust the height; and (iii) mounting the car side walls and preferably subsequently the car roof on the car floor leveled in this way.

DESCRIPTION OF THE DRAWINGS

Further individual features and advantages of the invention can be derived from the following description of embodiments and from the drawings. In the drawings.

DETAILED DESCRIPTION

Figure 1:
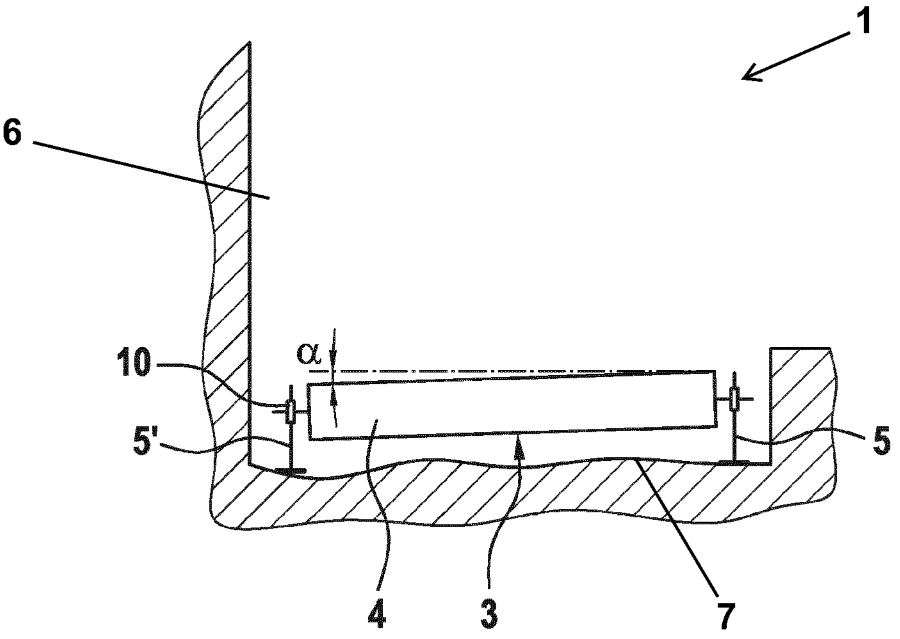
FIG. 1 shows a highly simplified representation of an elevator shaft with a car floor placed on the shaft floor.

FIG. 1 shows a lower region of an elevator shaft 6 for an elevator system denoted as a whole by 1. In the present case, the elevator system 1 has an elevator shaft 6 having a small pit depth. A car floor denoted by 3 is located on the shaft floor 7 of the elevator shaft 6. The car floor consists of a base part 4, which defines a standing area for passengers, and of installation feet 5, 5' via which the car floor 3 is supported on the shaft floor 7.

Concrete is frequently used to produce the elevator shaft. It is difficult to produce the shaft floor 7 so as to have a planar and horizontal surface. Therefore, the car floor may have a slight tilt after being set down for the first time. This tilt can be eliminated by means of height-adjustable installation feet 5, 5'. For this purpose, as shown by way of example in FIG. 2, the height-adjustable installation foot 5' is adjusted in height until the base part 4 is brought into the desired horizontal position. After the base part 4 has been oriented, installation of the elevator car 2 can be continued as shown in FIG. 3. The car side walls 8 can now be mounted on the car floor 3 leveled in this manner. After the car side walls 8 have been mounted, the car roof 9 indicated by dashed lines can finally be fitted on the car side walls 8.

Figure 4:
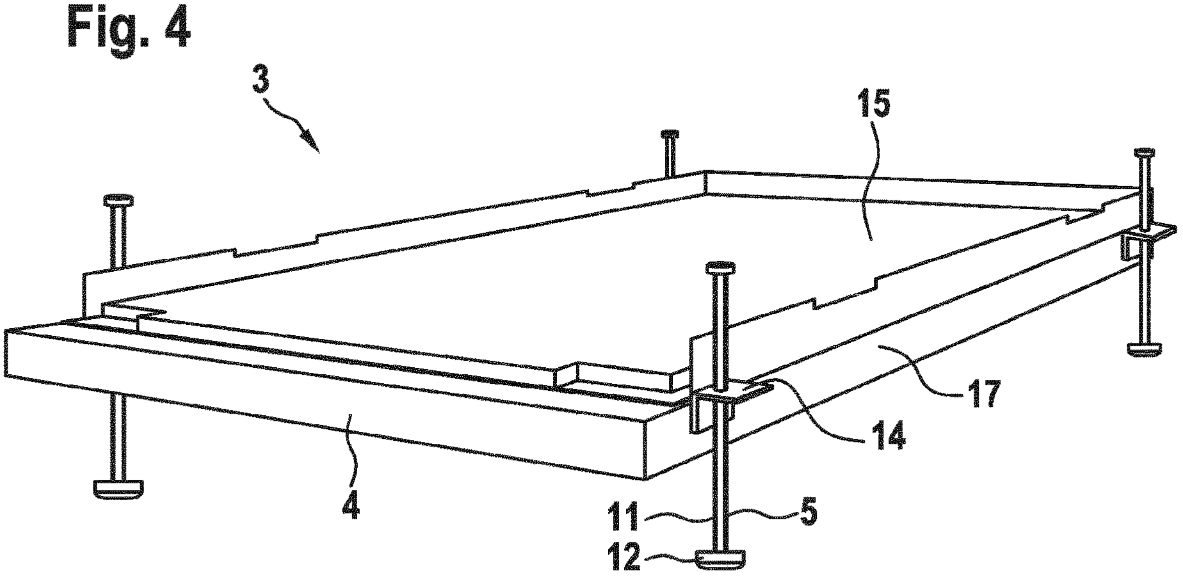
FIG. 4 shows a perspective representation of an elevator car floor in accordance with the invention.
Figure 5:
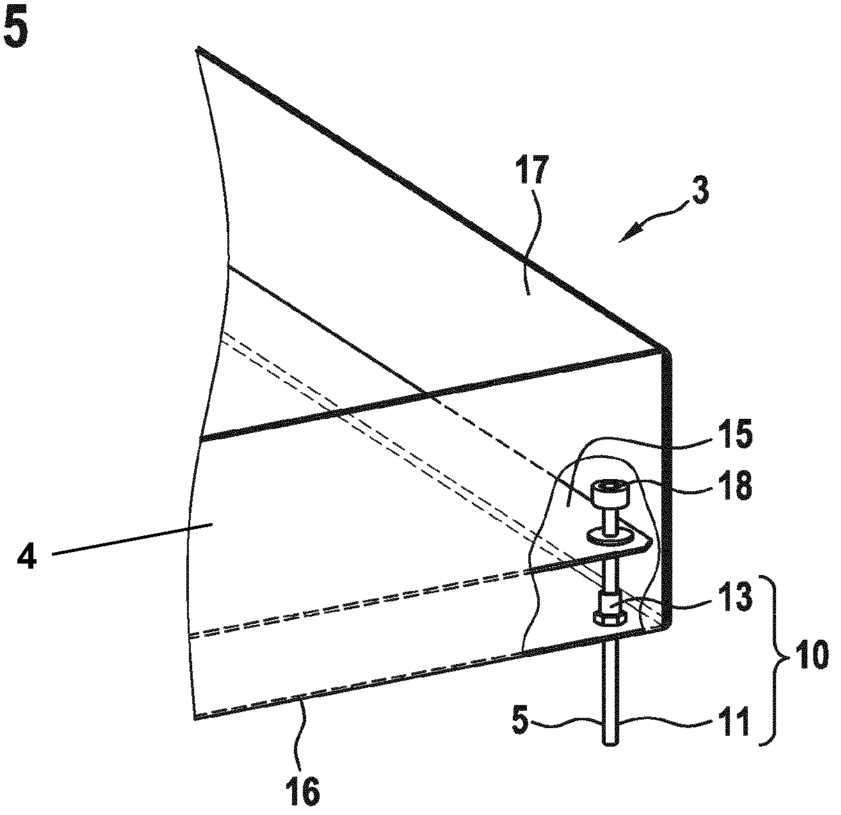
FIG. 5 shows a perspective partial view of a corner region of a car floor in accordance with an alternative embodiment.

FIG. 4 is a perspective view of a rectangular car floor 3 having four height-adjustable installation feet 5 arranged in corner regions. The respective installation feet 5 are arranged on the outside of the base part 4 in the corner regions thereof via spacer elements 14. In the present case, the spacer elements 14 are designed as angular pieces which are fastened to the vertical side wall portions 17 of the base part 4. In the embodiment in accordance with FIG. 4, the height-adjustable installation feet 5 are arranged outside the vertical projection of the base part 4. FIG. 5 shows a variant in which the height-adjustable installation feet 5 are arranged within the vertical projection of the base part 4.

The height-adjustable installation feet 5 are designed and can be actuated manually in such a way that the height adjustment can take place from the base part 4. The tilt (indicated by the angle of inclination a of the car floor relative to the horizontal in FIG. 1) can be eliminated in this way. In the example shown in FIG. 2, the installer 19 actuates the left-hand height-adjustable installation foot denoted by 5'. For the height adjustment, the relevant installation foot 5, 5' can be moved upward and downward in the vertical direction (indicated by an arrow) by mechanical means 10, for example by means of a screw mechanism.

As can be seen from the two embodiments in accordance with FIGS. 4 and 5, the installation foot 5 can be adjusted in height by means of a threaded spindle. The height-adjustable installation foot 5 comprises a threaded rod 11, which is accommodated in an internal thread which is associated with the base part 4 and corresponds to the threaded rod. On account of the threaded rod 11 extending in the vertical direction, the car floor 3 can be raised or lowered locally at the relevant car foot and the desired height can thus be set precisely.

In the embodiment in accordance with FIG. 4, the spacer elements 14 contain the internal threads in which threaded rods 11 of the installation feet 5 are received. As shown in FIG. 4, stamp-like support elements 12 can be arranged on lower ends of the threaded rods 11 facing the shaft floor in order to increase the contact surface area with respect to the shaft floor 7. To actuate the threaded spindle, the upper threaded rod end of one of the threaded rods 11 is, for example, gripped by means of a tool (not shown here) and rotated as desired either in the clockwise direction or in the counterclockwise direction in order to adjust the height.

In the embodiment in accordance with FIG. 5, the base part 4 has internal threads integrated therein or arranged on the inside, in which the respective threaded rods 11 are received. In the present embodiment, a screw nut 13, which is secured to the base plate 16 and with a metal sleeve adjoining it, has the internal thread. By way of example, a screw head 18 for an Allen key is provided on the upper end of the threaded rod 11. Of course, other engagement or actuating means for the height adjustment are also conceivable. For example, instead of the screw head shown by way of example, rotary handles, thumb screws, or tommy screws are possible as actuating means.

It can be seen from FIG. 5 that the base part 4 is a planar component in a composite structure or sandwich construction. The base part 4 substantially consists of the base plate 16, a cover plate 15, and an intermediate composite structure core (not shown specifically).

Figure 2:
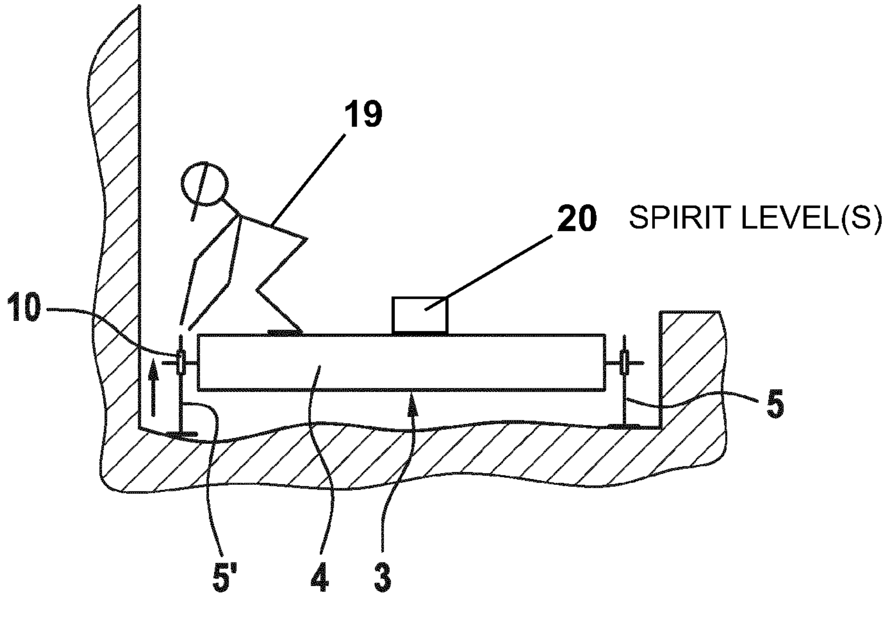
FIG. 2 shows the car floor after a leveling process.
Figure 3:
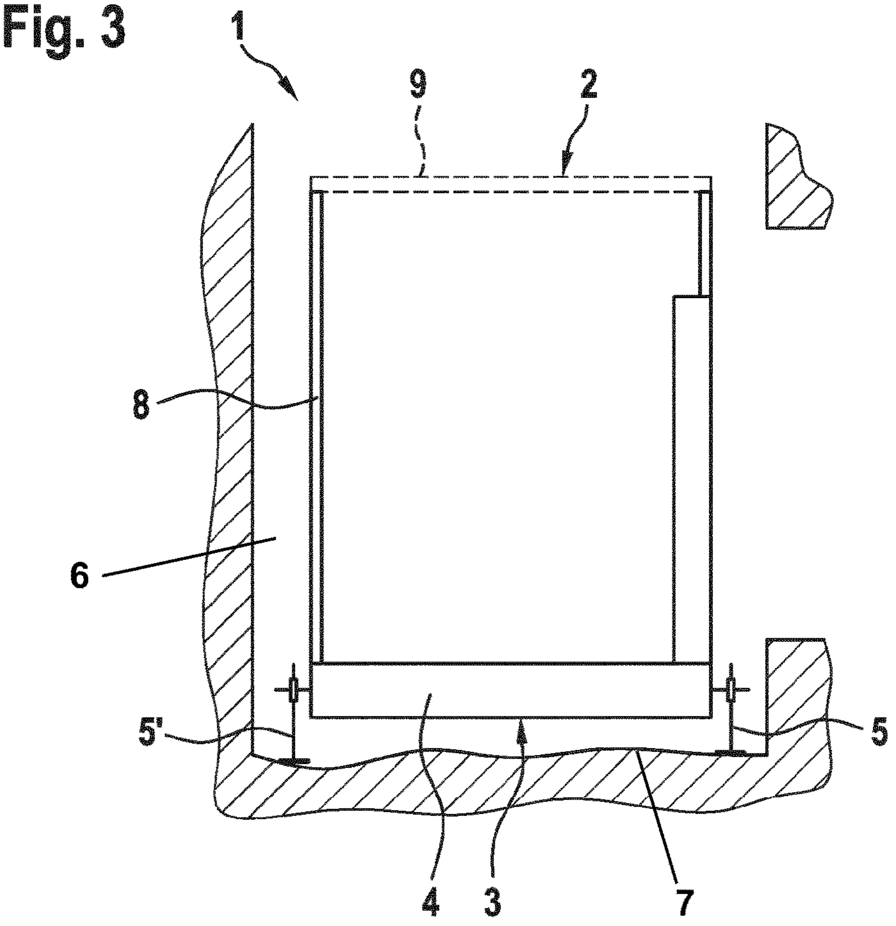
FIG. 3 shows the car floor with car side walls mounted thereon.

To check the horizontal position, spirit levels 20, for example a circular spirit level or two tubular spirit levels arranged crosswise with respect to one another, can be fastened to the base part 4 (FIG. 2).

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A car floor for an elevator car, the car floor comprising:

a base part providing a standing area for passengers when the base part is installed in the elevator car;

a plurality of installation feet arranged on the base part and adapted to support the base part on an elevator shaft floor, at least one of the installation feet being a height-adjustable installation foot adapted to orient the base part in a horizontal position relative to the shaft floor; and wherein the height-adjustable installation foot enables a height adjustment relative to the shaft floor to be made from the standing area of the base part by an installer.

2. The car floor according to claim 1 wherein the base part has a rectangular shape in plan view for creating a cuboid elevator car and four of the installation feet are each arranged in a respective corner region of the base part.

3. The car floor according to claim 1 wherein that the height-adjustable installation foot includes a threaded spindle enabling an adjustment in a height of the base part relative to the shaft floor.

4. The car floor according to claim 1 wherein the height-adjustable installation foot includes a threaded rod.

5. The car floor according to claim 1 including a plurality of spacer elements positioning the installation feet outside of a vertical projection of the base part, the spacer elements being fastened to or integrally formed on the base part.

6. The car floor according to claim 1 wherein the installation feet are positioned within a vertical projection of the base part, the base part having internal threads into which associated threaded rods are received, and each of the threaded rods being included in an associated one of the installation feet.

7. The car floor according to claim 1 including a plurality of support elements, each of the support elements being arranged on a lower end of an associated one of the installation feet and adapted to contact the shaft floor.

8. The car floor according to claim 7 wherein each of the lower ends is a lower end of a threaded rod of the associated installation foot.

9. The car floor according to claim 1 including at least one spirit level fastened to the base part and being adapted to check the horizontal position of the base part.

10. A method for installing an elevator car in an elevator shaft of an elevator system, the method comprising the steps of:

introducing a car floor into the elevator shaft, wherein the car floor is set down to rest on a shaft floor of the elevator shaft, the car floor having a base part providing a standing area for passengers when the base part is installed in the elevator car;

leveling the car floor resting on the shaft floor using installation feet arranged on the car floor, at least one of the installation feet being a height-adjustable installation foot adapted to orient the car floor in a horizontal position relative to the shaft floor, wherein the height-adjustable installation foot enables a height adjustment relative to the shaft floor to be made from the standing area of the base part by an installer; and mounting car side walls on the car floor.

* * * * *